Aug. 2, 1966     A. R. PFAFF, SR., ET AL     3,263,547
STEEL RULE CUTTING DIE
Filed Aug. 14, 1964     2 Sheets-Sheet 2
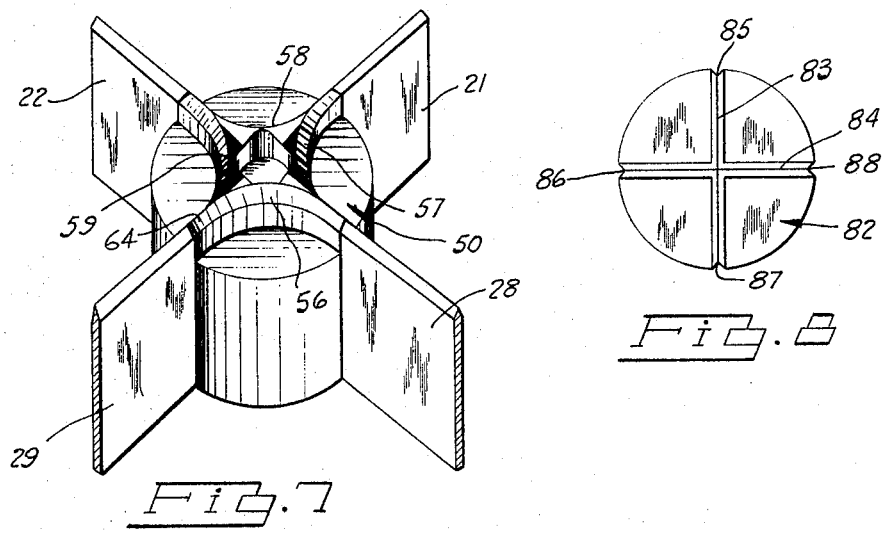
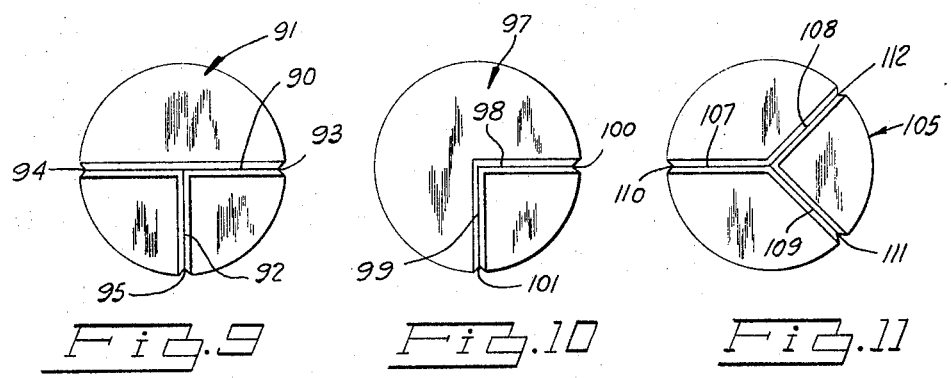
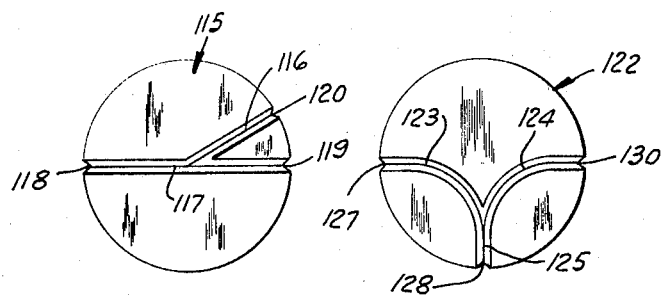
INVENTORS.
ALAN R. PFAFF SR.
ALAN R. PFAFF JR.
BY
ATTORNEYS United States Patent Office 3,263,547
Patented August 2, 1966

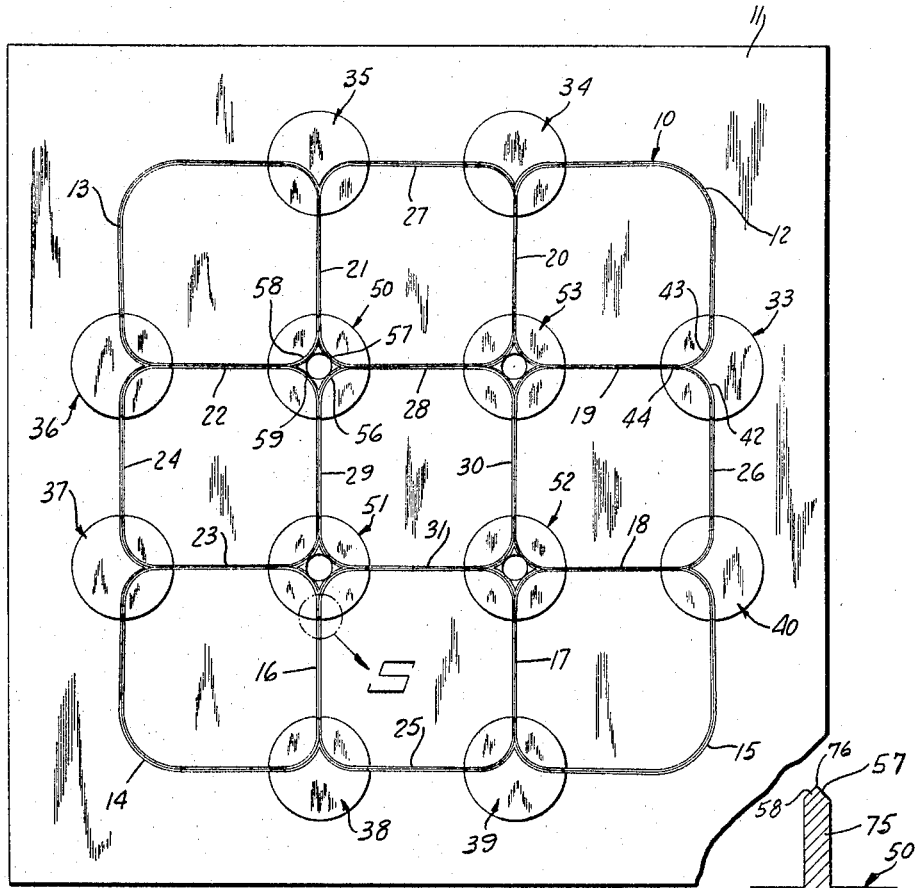

3,263,547
STEEL RULE CUTTING DIE
Alan R. Pfaff, Sr., Bloomfield Hills, and Alan R. Pfaff, Jr., Orchard Lake, Mich., assignors to Bernal Tool & Machine Co., Detroit, Mich., a corporation of Michigan
Filed Aug. 14, 1964, Ser. No. 389,715
6 Claims. (Cl. 83—620)

This invention relates to a steel rule cutting die and more particularly to an improved construction of a steel rule cutting die which facilitates the assembly of steel rule dies.

It is known in the art of steel rule cutting dies that cutting dies may be assembled in sections to cut a required configuration from certain material. This type of cutting die is employed in fabricating gaskets, set-up boxes and many other non-ferrous materials. In assembling these dies, it is frequently the practice to connect two or more sections of steel cutting rules in close association with each other in a wood die board. The assembling of these sections of steel cutting rules to form a die involves the problem of aligning the cutting edges of the adjacent cutting rules. This problem of aligning the rule cutting edges is intensified when all of the sections of the cutting rules are not of the same gage. Even though the cutting rules are carefully joined together, and even to the extent of being brazed, they are subject to troublesome separation during operation. Still further, because of the method of fabrication or assembly of the steel rules, only a limited number of impressions or cuts is possible before reassembly is required. Further, these rule separations entail a loss of time in both labor and equipment, during the down time or the period in which repairs are being made or new steel rules are being installed.

Accordingly, it is an object of this invention to provide an improved steel rule construction.

It is another object of this invention to provide a steel rule cutting die which is simple in construction and which obviates the above mentioned disadvantages.

It is yet another object of this invention to provide a steel rule cutting die which permits the use of steel cutting rules of any size such as one point, two points or three points.

A still further object of this invention is to provide a rule joiner for a steel rule cutting die which will always align the cutting edges of the various pieces of steel cutting rules comprising the die regardless of the particular gage cutting rule employed.

Still another object of this invention is to provide a steel rule cutting die assembly which decreases the set-up time.

Still another object of this invention is to provide a steel rule cutting die which will not tend to come apart at the juncture points of the various rule cutting elements comprising the die.

Other objects, features and advantages of this invention will be apparent from the following detailed description, appended claims, and the accompanying drawings.

In the drawings:

FIG. 1 is a bottom plan view of an illustrative steel rule cutting die made in accordance with the principles of this invention;

FIG. 2 is an elevational side view of a steel rule joiner according to one illustrative embodiment of this invention;

FIG. 3 is a top plan view of the steel rule joiner of FIG. 2, taken along the line 3—3 thereof;

FIG. 4 is a view in section of the steel rule joiner of FIG. 2, taken along the line 4—4 thereof, and looking in the direction of the arrows;

FIG. 5 is a fragmentary, enlarged sectional view of the structure illustrated in FIG. 1, taken within the circle marked by the numeral 5;

FIG. 6 is a fragmentary, enlarged, elevational sectional view of the steel rule joiner structure of FIG. 3, taken along the line 6—6 thereof, and looking in the direction of the arrows;

FIG. 7 is a perspective view of the steel rule joiner embodiment of FIG. 3, and showing the method of joining a plurality of cutting rules; and, FIGS. 8 through 13 are top plan views of various rule joiners made in accordance with the principles of this invention.

Referring now to FIG. 1, there is depicted a plan view of one embodiment of a steel rule cutting die according to this invention. As depicted therein, a steel rule cutting die, generally indicated by the numeral 10, is mounted on a plate 11 which is usually made from a suitable wood material, such as plywood, in a manner well known in the art. For purposes of explanation the steel rule cutting die 10 is shown as being formed as a square, including 3 x 3 squares of cutting rule elements for cutting a plurality of substantially square pieces of paper. Four of the cutting rule elements have substantially right angled portions, as indicated by the numerals 12, 13, 14 and 15. The remainder of the steel rule cutting die 10 includes a series of straight cutting rule elements or sections joined together by a plurality of "rule joiner" members. The term "rule joiner" as employed herein designates a cutting tool that is essentially a section of a steel rule cutting die.

The rule joiner members each include a substantially cylindrical body which has cutting surfaces secured to or formed on one flat circular end thereof. For example, rule joiner members join the straight cutting rule sections 16 through 31, and these rule joiner members include the members 33 through 40 which are disposed around the outer periphery of the steel rule cutting die 10. Each of the rule joiner members 33 through 40 is provided with a substantially V-shaped cutting rule on one end thereof. For example, the cutting rule on rule joiner 33 defines a V-shaped termination between a cutting rule section 42 which is mated or joined to the straight cutting rule section 26, a curved cutting rule section 43 which is mated to the substantially right angled cutting rule element 12, and a straight cutting rule element 44 extending from the apex of the V defined by the rule joiner cutting rule sections 42 and 43, and joining the straight cutting rule element 19. The inner straight steel rule cutting elements 28 through 31 are connected to the outer steel rule cutting elements by a plurality of substantially identical rule joiners 50 thorugh 53. Each of the rule joiners 50 through 53 connects four straight cutting rule sections of the cutting die 10.

The ruler joiners 50 through 53 join four cutting rule elements by means of curved cutting rule sections, such as the curved cutting rule sections 56, 57, 58 and 59 of the rule joiner 50. The curved surface cutting rule section 56 joins the straight cutting rule elements 28 and 29, while the curved surface cutting rule section 57 joins the straight cutting rule elements 21 and 28. Preferably, curved integral cutting rule sections such as these are employed to prevent clogging of the cutting rule juncture portions, particularly where an angle is formed in the material being cut.

FIG. 2 is a side elevational view of the rule joiner 50, drawn to an enlarged scale. This figure shows how the integral curved cutting rule elements 59 and 56 have vertical portions which are formed integrally with a tapered cutting edge such as 62 and 63, respectively. The juncture of these two curved edges 62 and 63 form a common cutting edge 64 which is substantially triangular in vertical cross section, at the upper portion thereof, and which is substantially rectangular in the remaining portion thereof. Advantageously, the rule joiner 50, as well as the other rule joiners 51 through 53, and 33 through 40, are provided with longitudinally extended notches which are preferably V-shaped, as illustrated by the notch 65 of the rule joiner 50. Because the notch 65 is V-shaped, and because the cooperating edges of the straight steel cutting rule elements have a corresponding V-shaped projection, the straight steel cutting rules will always be aligned with the cutting edges on the rule joiners, such as the edge 64 of the rule joiner 50. The V-shaped notch 65 terminates in a longitudinally formed line 66 which is preferably parallel to the axis of the cylindrical rule joiner 50. It is to be noted that previously steel cutting rules were joined by milling rectangular slots in the joining members and employing rectangular portions on the ends of the steel cutting rules to define an aligning engagement. This relationship, however, exhibited the disadvantage that it was difficult to accurately align the cutting edges on the cutting rules and the joining members, and to maintain this alignment throughout repeated operations of the steel rule cutting die. A further disadvantage of the last mentioned relationship is that it required that the thickness of the cutting rule correspond with the width of the slot in the joining member. The present arrangement, however, obviates the requirements for a plurality of sizes of cutting rules and slots in the joining members in a manner which will be subsequently described.

FIG. 3 is a top plan view to an enlarged scale of the cylindrical joiner 50. In this view, it is clearly seen that the curved cutting edges 56 through 59 terminate in common cutting edges which also terminate at the periphery of the cylinder in a plurality of V-shaped notches such as the notch 65 and the notches 67, 68 and 69. In each instance, the apex of the notch, or the line similar to the line 66 of FIG. 2 is aligned with the cutting edge, such as the alignment of the line 66 with the cutting edge 64.

FIG. 4 is a view in section, taken along the line 4—4 of FIG. 2, and showing the manner in which the substantially cylindrical rule joiner 50 receives straight steel cutting rule portions 21, 22, 29, and 28'. For the purpose of illustrating the adaptability of this rule joiner to receive the V-shaped projecting edge of a steel cutting rule, the larger gage steel cutting rule 28' has been substituted for the smaller gage steel cutting rule 28, to illustrate that the V-shaped notch in the rule joiner will align the cutting edge on the rule joiner with the cutting edge on the steel cutting rule regardless of whether the steel rule cutting die is formed with a smaller or larger gage cutting rule.

FIG. 5 is an enlarged sectional portion of the steel rule joiner 50 and more clearly shows the manner in which the V-shaped notch 65 receives a corresponding V-shaped projection 73 on the straight steel rule cutting die 29.

FIG. 6 is a view in section to a still further enlarged scale, taken along the line 6—6 of FIG. 3 and showing the configuration of the cutting rule 75 on the rule joiner 50 and how it terminates in a substantially triangular cross section cutting edge 76. The top surface of the cylindrical rule joiner 50 is substantially flat, as indicated in FIG. 6, and as also shown in FIG. 2. For simplicity, the cutting edges, such as the edge 76 defined by the junction of the curved surfaces 57 and 58, are formed integrally with the cylindrical joiner 50.

FIG. 7 is a view in perspective of the rule joiner 50 and the steel cutting rules 21, 22, 28 and 29 which are joined to the curved surfaces 56, 57, 58 and 59 of the joiner 50. It is to be noted that the straight cutting rules 21, 22, 28 and 29 have a height substantially equal to the combination of the steel rule joiner 50 plus the height of the cutting edges thereon. With this arrangement, the cutting edges formed by the combination of the rule joiners and cutting rules all lie in a common horizontal plane.

FIGS. 8 through 13 are top plan views of various ruler joiners showing different arrangements of cutting edges for joining different straight cutting rules such as the rule joiner 82 joining substantially perpendicular cutting edges 83 and 84, and each terminating in a V-shaped notch such as the notches 85, 86, 87 and 88.

The rule joiner of FIG. 9 shows a manner of joining three cutting edges, one of the cutting edges being perpendicular to the other two. In this particular instance, an elongated straight cutting edge 90 on the rule joiner member 91 is joined to a perpendicular cutting edge 92. In the rule joiner 91 of FIG. 9, the cutting edges 90 and 92 each terminate at the edges of the cylindrical rule joiner 91 in substantially V-shaped notches, such as the notches 93 and 94 for the cutting edge 90, and the notch 95 for the cutting edge 92.

FIG. 10 shows another rule joiner 97 in which a right angle cutting edge includes a first cutting edge 98 forming a right angle with the second cutting edge 99 on the top surface of the cylindrical member or rule joiner 97. The cutting edge 98 terminates in a V-shaped notch 100, extending the length of the cylindrical rule joiner 97, and the cutting edge 99 terminates in a V-shaped notch 101, also extending the length of the rule joiner 97.

FIG. 11 shows a further embodiment of the rule joiner indicated by the numeral 105 in which cutting edges define a Y-shaped cutting edge including a base member 107 and a pair of fork members 108 and 109. Each of the cutting edges terminates in a longitudinal V-shaped notch, such as the notches 110, 111 and 112.

FIG. 12 shows a rule joiner 115 having a cutting edge 116 which defines an acute angle with a diametrically extending cutting edge 117 and each of the edges terminates in a V-shaped notch, such as the notches 118, 119, and 120.

In the embodiment of FIG. 13, a rule joiner 122 is disclosed which employs a pair of curved cutting edges 123 and 124, which are joined at a common base portion or cutting edge 125, and each of the cutting edges terminates in a notch which is also V-shaped, such as the notches 127, 128 and 130.

While we have shown and described several illustrative embodiments of this invention, it is understood that the concepts thereof may be employed in other embodiments without departing from the spirit and scope of this invention. For example, while the invention has been described relative to a steel rule cutting die in which the V-shaped notches are formed on the cylindrical rule joiners and the V-shaped projections are formed on the straight cutting rule portions, it is understood that this relationship may be reversed. The relationship which is disclosed in the drawings, however, is preferred. Further, after the V-shaped projections of the cutting rule elements are inserted in the notches of the rule, these parts may be welded or brazed together in any suitable manner well known in the art.

What is claimed is:

1. A steel rule cutting die comprising:
   a plurality of straight rule cutting members joined by a plurality of joiner members, one of the members of each joint being characterized by a V-shaped notch, and the other member of each joint being characterized by a corresponding V-shaped projection positioned within said notch.

2. In a steel rule cutting die, a rule joiner comprising:
   a body member, having at least a pair of cutting edges on one end thereof terminating at the peripheral edge of said rule joiner, and, each cutting edge terminating at a substantially V-shaped notch extending longitudinally of said body member.

3. The combination according to claim 2, wherein: said cutting edges each include a pair of cutting surfaces joined together at substantially right angles to each other.

4. The combination according to claim 2, wherein: said cutting edges are joined together in a Y-shaped configuration, each arm of the Y terminating in a V-shaped longitudinal notch on the periphery of said body member.

5. In a steel rule cutting die, the combination comprising:
   a rule joiner member and a cutting rule member coupled together, said rule joiner having a cutting edge thereon, said cutting edge being aligned with said cutting rule and having a gage different from that of the cutting rule.

6. The combination according to claim 5, wherein: one of the members has a V-shaped notch therein, and wherein the other member has a V-shaped projection positioned within said notch, to provide axial alignment between the cutting edges on said members.

References Cited by the Examiner

UNITED STATES PATENTS

| 999,844 | 8/1911 | Nilsson | 83—652 |
| 3,180,191 | 4/1965 | Midgley et al. | 83—620 X |

WILLIAM S. LAWSON, *Primary Examiner.*